UNITED STATES PATENT OFFICE.

JOHN CARNRICK, OF NEW YORK, N. Y.

MEDICINAL EMULSION.

SPECIFICATION forming part of Letters Patent No. 327,230, dated September 29, 1885.

Application filed February 4, 1885. (No specimens.) Patented in England May 1, 1884. No. 7,110.

*To all whom it may concern:*

Be it known that I, JOHN CARNRICK, of New York, in the county of New York and State of New York, have invented certain new and useful Improvements in Nutritive and Medicinal Emulsions or Compositions; and I do hereby declare that the following is a full, clear, and exact description of the invention, which will enable others skilled in the art to which it appertains to make and use the same.

This invention relates to a nutritive and medicinal composition or emulsion; and its object is to provide an emulsion which is agreeable in appearance and taste and possessed of highly nutritive and invigorating qualities, and suitable for use in cases of debility and in all cases in which a physician would properly prescribe a readily digestible and assimilable nutritive.

The essential ingredients of my improved emulsion are cod-liver oil, milk, a digestive ferment—such as pepsin or pancreatine, the former having the property of digesting the nitrogenous components and the latter of digesting the fatty matter of the milk and the oil—and glycerine combined with the other ingredients to assist in maintaining their union in the permanent form of an emulsion, and also to prevent any chemical change or undue fermentation in the emulsion.

In order that the emulsion may be more readily digested and assimilated, and therefore better suited to persons with weak or sensitive digestive organs, the oil or milk may be wholly or in part digested with pepsin or with pancreatine—that is to say, pepsin may be combined with the milk and cod-liver oil to digest the nitrogenized components thereof; or, instead of pepsin, pancreatine may be used, and this will digest a greater or less portion of the fatty components of the milk and the cod-liver oil, the quantity thus digested being in proportion, of course, to the quantity of pancreatine used. When desired, both pancreatine and pepsin may be used. The emulsion thus prepared with one or the other, or both, as the case may be, of the said digestive ferments is quite palatable and is in the best form for digestion, and is readily assimilated when taken as food or medicine.

The pepsin or pancreatine used is preferably dissolved in glycerine previous to its mixture with the oil and milk. In such case the glycerine assists in maintaining the union of the oil and milk, and also acts as a preservative. The milk and oil may both be digested by the digestive ferments used either separately or together; or the milk only or the cod-liver oil only may be digested, as is deemed most expedient or desirable.

In preparing the emulsion I mix together about equal quantities of the cod-liver oil and of the milk, one or both previously digested with the digestive ferment, as hereinbefore explained, and emulsionize the same in the usual manner of preparing emulsions. I preferably use a sufficient quantity of mucilaginous substance—as, for example, gum-arabic—to increase the permanency of the emulsion. The proportion of milk used depends somewhat upon its degree of concentration. I prefer, as a rule, that the milk be somewhat concentrated by evaporation. A small quantity of any suitable preservative—such, for example, as boracic acid—may be used to keep the emulsion pure during any desired period of time.

The use of milk, and especially concentrated milk, in the emulsion possesses important advantages over water, ordinarily used, for with milk the emulsion is more easily formed, and, besides, the milk contains all the necessary constituents to maintain healthy nutrition, and is, therefore, a valuable aid to the oil as a nutritive agent. By digesting the oil and the milk, one or both of them, with the digestive ferments aforesaid, the emulsion formed is most readily digested and assimilated by the person using it, and possesses in a very high degree medicinal and nutritive properties. My said emulsion may also be used in conjunction with or at the same time with other nutritive or medicinal substances.

When desired, any other innocuous substance having preservative qualities equivalent to those of glycerine may be employed in place of the glycerine as the equivalent of the same.

I am aware that emulsions of cod-liver oil with digestive ferments is not new, and that glycerine and hypophosphites have been added to such emulsions with gum as the suspending agent. Such, therefore, I do not claim; but

What I claim as my invention is—

A nutritive and medicinal composition, being an emulsion consisting of cod-liver oil, milk, a digestive ferment, and glycerine, substantially as herein set forth.

In testimony that I claim the foregoing as my own, I affix my signature in presence of two witnesses.

JOHN CARNRICK.

Witnesses:
HENRY C. BANKS,
JOHN B. PERRY, Jr.